United States Patent [19]

Lustig et al.

[11] Patent Number: 4,892,603
[45] Date of Patent: Jan. 9, 1990

[54] IRRADIATED MULTILAYER FILM FOR PRIMAL MEAT PACKAGING

[75] Inventors: Stanley Lustig, Park Forest; Jeffrey M. Schuetz, Woodridge; Stephen J. Vicik, Darien, all of Ill.

[73] Assignee: Viskase Corporation, Chicago, Ill.

[21] Appl. No.: 243,133

[22] Filed: Sep. 9, 1988

Related U.S. Application Data

[63] Continuation of Ser. No. 134,657, Dec. 18, 1987, abandoned, which is a continuation of Ser. No. 744,680, Jun. 14, 1985, Pat. No. 4,714,638.

[51] Int. Cl.⁴ .............................................. B32B 31/00
[52] U.S. Cl. ........................... 156/244.11; 156/244.27; 156/229; 156/273.7
[58] Field of Search ................ 156/244.27, 229, 273.7, 156/244.1

[56] References Cited

U.S. PATENT DOCUMENTS

| | | | |
|---|---|---|---|
| 3,879,330 | 4/1975 | Lustig | 260/859 R |
| 4,044,187 | 8/1977 | Kremkau | 428/212 |
| 4,112,181 | 9/1978 | Baird et al. | 428/306 |
| 4,278,738 | 7/1981 | Brax et al. | 428/515 |
| 4,318,763 | 3/1982 | Bieler et al. | 156/198 |
| 4,352,702 | 10/1982 | Bornstein | 156/84 |
| 4,442,158 | 4/1984 | Distler | 428/195 |
| 4,448,792 | 5/1984 | Schirmer | 426/113 |
| 4,457,960 | 7/1984 | Newsome | 428/35 |
| 4,737,391 | 4/1988 | Lustig et al. | 428/216 |
| 4,865,780 | 9/1989 | Lustig et al. | 428/516 |

FOREIGN PATENT DOCUMENTS 1078247 5/1980 Canada .
202814 7/1986 European Pat. Off. .

Primary Examiner—Edith Buffalow
Attorney, Agent, or Firm—John C. LeFever

[57] ABSTRACT

A heat-shrinkable, multilayer film suitable for use in fabricating bags for packaging primal and sub-primal meat cuts and processed meats. The multilayer film has a first outer layer of an ethylene-vinyl acetate copolymer, a core layer of a barrier film comprising vinylidene chloride-methyl acrylate copolymer, and a second outer layer of an ethylene-vinyl acetate copolymer. The multilayer film is preferably made by co-extrusion of the layers, and then it is biaxially stretched. After biaxial stretching, the multilayer film is irradiated to a dosage level of between 1 megarad and 5 megarads and heat-sealed in the form of a bag. The bag has improved storage stability characteristics.

26 Claims, 1 Drawing Sheet

COLOR DEVELOPMENT IN IRRADIATED FILMS

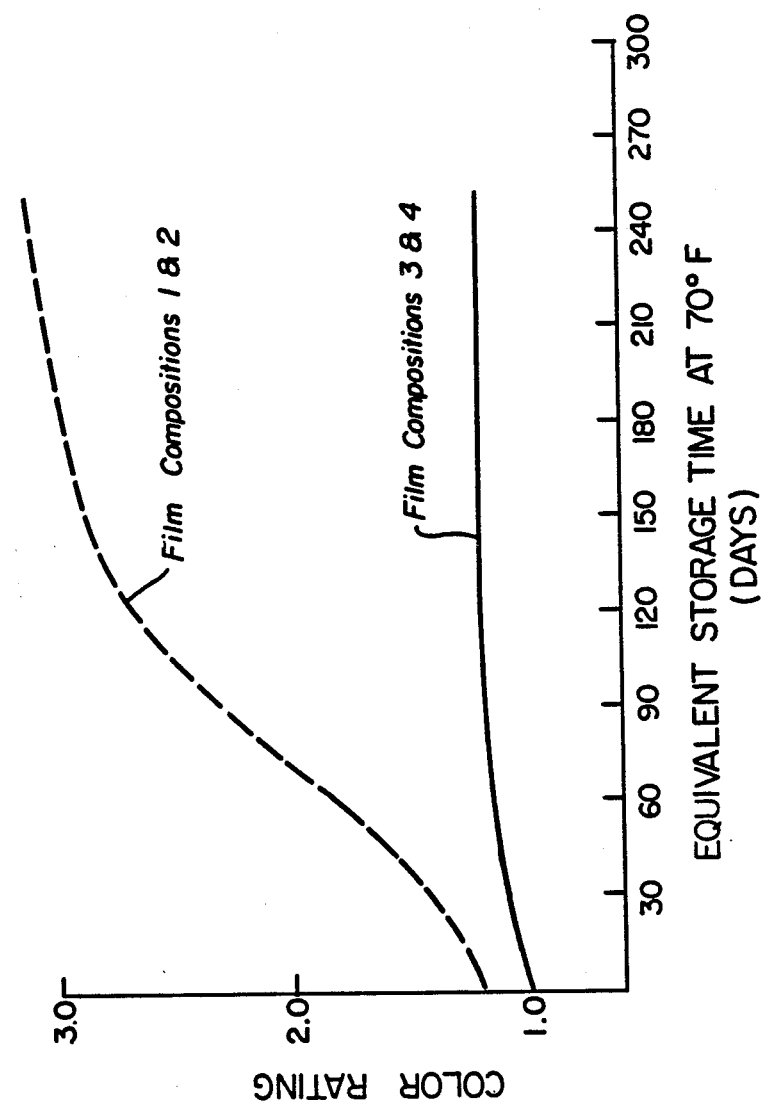

IRRADIATED MULTILAYER FILM FOR PRIMAL MEAT PACKAGING

This application is a continuation of prior U.S. application Ser. No. 134,657, filing date Dec. 18, 1987 now abandoned, and which is a continuation of application Ser. No. 744,680, filed June 14, 1985, now U.S. Pat. No. 4,714,638.

FIELD OF THE INVENTION

This invention relates to an irradiated multilayer film suitable for use in the manufacture of bags for packaging primal and sub-primal meat cuts and processed meats. This invention also relates to such film comprising an irradiated three-layer film wherein the outer layers of the film comprise ethylene-vinyl acetate copolymers, and the core layer comprises copolymers of vinylidene chloride and methyl acrylate, and to the process for manufacturing such film.

BACKGROUND OF THE INVENTION

Primal meat cuts, or primals, are large cuts of meat, smaller, for example, than a side of beef, but larger than the ultimate cut that is sold at retail to the consumer. Primal cuts are prepared at the slaughter house and are then shipped to a retail meat store or an institution such as a restaurant where they are butchered into smaller cuts of meat called sub-primal meat cuts or sub-primals. Sub-primals may also be prepared at the slaughter house. When primals and sub-primals are prepared at the slaughter house, they are usually packaged in such a way that air (i.e., oxygen) is prevented from contacting the meat during shipping and handling in order to minimize spoilage and discoloration. One desirable way to package primals and sub-primals so as to protect them from degradation due to moisture loss and contact with air is to shrink package them with a packaging material that has good barrier properties. One such shrink packaging material that has good oxygen and moisture barrier properties is vinylidene chloride-vinyl chloride copolymer film.

One approach to the provision of a film for use in shrink packaging primal and sub-primal meat cuts and processed meats is to employ a multilayer film having oxygen and moisture barrier properties, one layer of which is a vinylidene chloride-vinyl chloride copolymer film. The other layer or layers of such a multilayer film are selected so as to provide the requisite low temperature properties and abrasion resistance which are lacking in vinylidene chloride-vinyl chloride film. In providing such a film, however, it must be recognized that good barrier properties, abrasion resistance, and low temperature properties are not the only requirements for a film that is to be used for shrink packaging primal and sub-primal meat cuts. The film must have been biaxially stretched in order to produce shrinkage characteristics sufficient to enable the film to heat shrink within a specified range of percentages, e.g., from about 30 to 60 percent at about 90° C., in both the machine and the transverse directions.

The film must also be heat sealable in order to be able to fabricate bags from the film and in order to heat seal the open mouths of the fabricated bags when the meat cut has been placed within the bag. Additionally, the heat sealed seams of the bags must not pull apart during the heat shrinking operation, the film must resist puncturing by sharp edges such as bone edges during the heat shrinking operation, and there must be adequate adhesion between the several layers of the film so that delamination does not occur, either during the heat shrinking operation or during exposure of the film to the relatively high temperatures that may be reached during shipping and storage of the film in the summertime.

It has been proposed to prepare multilayer films, one layer of which is a vinylidene chloride-vinyl chloride copolymer and at least one other layer of which is an ethylene-vinyl acetate copolymer. For example, such films are proposed in McFedries, Jr., et al. U.S. Pat. No. 3,600,267, Peterson U.S. Pat. No. 3,524,795, Titchenal et al. U.S. Pat. No. 3,625,348, Schirmer U.S. Pat. Nos. 3,567,539 and 3,607,505, and Widiger et al U.S. Pat. No. 4,247,584.

In addition, multilayer films comprising a core layer of a vinylidene chloride copolymer, wherein the vinylidene chloride copolymer is a copolymer of a vinylidene chloride monomer and a vinyl chloride monomer, are known, for example as disclosed in Brax et al, U.S. Pat. Nos. 3,741,253 and 4,278,738, Baird et al, U.S. Pat. No. 4,112,181, and Lustig et al Canadian Pat. No. 982,983.

Also in the prior art, cross-linking by irradiation has been used to enhance the properties of films employed in packaging operations. For example, U.S. Pat. No. 3,741,253 to Brax et al teaches a multi-ply laminate having a first ply of ethylene-vinyl acetate which is cross-linked by irradiation. The second ply and the third ply of the laminate are not irradiated. The thus-prepared laminate may then be biaxially stretched. Baird et al U.S. Pat. Nos. 3,821,182 and 4,112,181 teach a three-layer film combination which has been irradiated before stretching. Further, Bernstein et al U.S. Pat. Nos. 4,391,862 and 4,352,844 disclose co-extruding first and second polymeric layers, irradiating the co-extruded layers, joining a third layer to the second polymeric layer, and then stretching the multilayer film. Still further, Bieler et al U.S. Pat. No. 4,318,763 teaches that the seals of the bags made of multilayer film may be strengthened by cross-linking the seal area of the bag by irradiation.

However, it has been found that an irradiated multilayer film containing a vinylidene chloride-vinyl chloride copolymer layer discolors significantly during storage due to degradation of the vinylidene chloride-vinyl chloride layer. It is believed that discoloration of the vinylidene chloride-vinyl chloride copolymer layer is due to radiation induced cleavage of hydrogen and chloride radicals therein, thereby resulting in the production of double bonds and the associated chromophores.

The present invention is based upon the discovery that multilayer films, fully described below, having outer layers of ethylene-vinyl acetate copolymers and having a core layer of a vinylidene chloride-methyl acrylate copolymer barrier film, which are irradiated after biaxial stretching to cross-link the ethylene-vinyl acetate layers, can be successfully employed in the shrink packaging of primal and sub-primal meat cuts and processed meats. Specifically, this invention provides such a multilayer film that has outstanding color stability after irradiation, whereby it can be advantageously employed to fabricate bags useful for shrink packaging primal and sub-primal meat cuts and processed meats.

SUMMARY OF THE INVENTION

Pursuant to the instant invention, it has been found that a heat-shrinkable multilayer film having outer layers of ethylene-vinyl acetate copolymers and a core layer of a vinylidene chloride-methyl acrylate copolymer barrier film, wherein the multilayer film has been biaxially stretched and then irradiated to a dosage level of between about 1 megarad and about 5 megarads, when employed to make bags for packaging primal and sub-primal meat cuts and processed meats, such a film provides bags having improved physical characteristics, whereby the bags when stored are more color-stable than those of the prior art and have the ability to withstand high sealing temperatures.

BRIEF DESCRIPTION OF THE DRAWING

FIG. 1 is a graphic representation of color development in irradiated films after various storage periods.

DETAILED DESCRIPTION OF THE INVENTION

In accordance with this invention, there is provided a heat shrinkable multilayer film having a first outer layer comprising a first ethylene-vinyl acetate copolymer, said first ethylene-vinyl acetate copolymer having a melt index of from about 0 1 to about 1.0 decigram per minute and a vinyl acetate content of from about 9 to about 15 weight percent, based on the weight of said first ethylene-vinyl acetate copolymer; a core layer comprising a vinylidene chloride-methyl acrylate copolymer containing from about 5 weight percent to about 15 weight percent methyl acrylate, based on the weight of said copolymer; and a second outer layer comprising a second ethylene-vinyl acetate copolymer selected from the group consisting of (a) an ethylene-vinyl acetate copolymer having a melt index of from about 0.1 to about 1.0 decigram per minute and a vinyl acetate content of from about 3 to about 18 weight percent, and preferably from about 10 to about 15 weight percent, based on the weight of said second ethylene-vinyl acetate copolymer, and (b) a blend of two ethylene-vinyl acetate copolymers, wherein one of said ethylene-vinyl acetate copolymers has a melt index of from about 0.1 to about 1.0 decigram per minute and a vinyl acetate content of from about 10 to 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer. The blend (b) of said two ethylene-vinyl acetate copolymers has a vinyl acetate content of from about 3 to about 18 weight percent, and preferably from about 10 to about 15 weight percent, based on the weight of said copolymers. The first ethylene-vinyl acetate copolymer can be a single ethylene-vinyl acetate copolymer or a blend of at least two ethylene-vinyl acetate copolymers having melt indices and vinyl acetate contents within the aforementioned ranges.

The heat shrinkable multilayer film of this invention can be produced by known techniques such as by co-extruding the multiple layers into a primary tube, followed by biaxially stretching the tube by known techniques to form a heat shrinkable film. The "double bubble" technique disclosed in Pahlke U.S. Pat. No. 3,456,044, is suitable for use in producing the film of this invention. After biaxial stretching, the multilayer film is then irradiated to a dosage level of between about 1 megarad and about 5 megarads, such as by passing it through an electron beam irradiation unit. The multilayer film may then be employed to manufacture heat-shrinkable bags useful in packaging primal and sub-primal meat cuts and processed meats.

In accordance with a preferred embodiment of this invention, the first outer layer of the multilayer film is an ethylene-vinyl acetate copolymer containing from about 9 to about 15 weight percent of vinyl acetate, based on the weight of the copolymer, said copolymer having a melt index of between about 0.1 and about 1.0 decigram per minute, and it may be selected from the group consisting of (a) a single ethylene-vinyl acetate copolymer and (b) a blend of ethylene-vinyl acetate copolymers having melt indices and vinyl acetate contents within the aforementioned ranges of values.

Further, in a preferred embodiment of this invention the core layer of the multilayer film of this invention comprises a vinylidene chloride-methyl acrylate copolymer containing at least 85 weight percent of vinylidene chloride, based upon the weight of the vinylidene chloride copolymer. The remainder of the vinylidene chloride copolymer is methyl acrylate. More preferably, the vinylidene chloride-methyl acrylate copolymer will contain at least about 85 weight percent, and not more than about 95 weight percent, of polymerized vinylidene chloride because when the vinylidene chloride copolymer contains less than about 85 weight percent vinylidene chloride, the methyl acrylate content would be greater than the maximum amount approved by the Food and Drug Administration for food contact uses, which is 15 percent by weight of the copolymer. If the vinylidene chloride content is more than 95 weight percent, the vinylidene chloride copolymer is generally not extrudable.

The vinylidene chloride copolymer preferably contains less than 5 weight percent plasticizer, the percentage being based on the total weight of the blend of copolymer and all additives including plasticizer, in order to maximize the barrier properties of the thin film. Conventional plasticizers such as dibutyl sebacate and epoxidized soybean oil can be used.

The second outer layer of the multilayer film of this invention comprises an ethylene-vinyl acetate copolymer selected from the group consisting of (a) an ethylene-vinyl acetate copolymer having a melt index of from about 0.1 to about 1.0 decigram per minute and a vinyl acetate content of from about 3 to about 18 weight percent, and preferably from about 10 to about 15 weight percent, based on the weight of said second ethylene-vinyl acetate copolymer, and (b) a blend of two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer. The blend (b) of said two ethylene-vinyl acetate copolymers has a vinyl acetate content of from about 3 to about 18 weight percent, and preferably from about 10 to about 15 weight percent, based on the weight of said copolymers.

The multilayer film of this invention will generally have a total thickness of from about 1.75 mils to about 3.0 mils, and preferably of from about 2.0 mils to about 3.0 mils, because when the thickness of the multilayer film is more than 3.0 mils, clipping problems are encountered in that it is difficult to gather together the open end of a bag made therefrom. When the thickness of the multilayer film is less than 1.75 mils, the bag will have diminished puncture resistance. The first outer layer will normally have a thickness of from about 1.1 mils to about 1.6 mils; the core layer will normally have a thickness of from about 0.25 mil to about 0.45 mil; and the second outer layer will normally have a thickness of from about 0.4 mil to about 1.0 mil.

The thickness of the first outer layer, which is the inner layer of the bag, should be within the aforementioned range because the sealing and processability properties of the film layer would otherwise be diminished. The thickness of the core layer should be within the above-indicated range because the film would provide inadequate barrier properties if the core layer thickness is less than about 0.25 mil. The upper limit of 0.45 mil for the core layer is primarily due to economic considerations. The thickness of the second outer layer, which is the outer layer of the bag, is selected in order to provide a total thickness of the multilayer film in the range of from about 1.75 mils to about 3.0 mils.

After biaxial stretching by any suitable method well known in the art, the multilayer film of this invention is irradiated to a dosage level of between about 1 megarad and about 5 megarads, and preferably between about 2 megarads and about 3 megarads, by any suitable method such as by employing an electron beam. It has been found that the irradiation energy applied to the multilayer film herein is important. That is, when the energy level is below the indicated range, sufficient cross-linking is not obtained so as to improve the heat sealing characteristics of the multilayer film or to have any enhanced effect upon the toughness properties of the film. When the energy level is above the afore-mentioned range, film discoloration due to degradation of the polyvinylidene chloride copolymer core layer is accelerated, the degree of the film shrinkage is significantly reduced, and further improvements in the heat sealing characteristics and toughness properties of the film are not achieved.

In another aspect of this invention, bags suitable for the shrink packaging of primal and sub-primal meat cuts and processed meats are provided from the aforedescribed multilayer film. The bags may be produced from the three-layer film of this invention by heat sealing. For instance, if the film of this invention is produced in the form of tubular film, bags can be produced therefrom by heat sealing one end of a length of the tubular film or by sealing both ends of the tube; then slitting one edge to form the bag mouth. If the film of this invention is made in the form of flat sheets, bags can be formed therefrom by heat sealing three edges of two superimposed sheets of film. When carrying out the heat sealing operation, the surfaces which are heat sealed to each other to form seams are the said first outer layers of the films of the invention. Thus, for example, when forming a bag by heat sealing one edge of a length of tubular film, the inner surface of the tube, i.e., the surface which will be heat sealed to itself, will be the said first outer layer of the film.

The invention is further illustrated by the examples which appear below.

In the examples, parts and percentages are by weight, unless otherwise specified.

The following test methods were used in determining the properties of the resins and films used in the examples. Melt index values were obtained pursuant to ASTM Method D-1238, condition E. Tensile strength values were obtained following ASTM Method D-882, procedure A.

Non-ASTM test methods employed are described in the following discussion. Shrinkage values were obtained by measuring unrestrained shrink at 90° C. for five seconds.

The dynamic puncture-impact test procedure is used to compare films for their resistance to bone puncture. It measures the energy required to puncture a test sample with a sharp triangular metal point made to simulate a sharp bone end. A Dynamic Ball Burst Tester, Model No. 13-8, available from Testing Machines, Inc., Amityville, Long Island, N.Y., is used and a ⅜ inch diameter triangular tip, as aforedescribed, is installed on the tester probe arm and employed in this test procedure. Six test specimens approximately 4 inches square are prepared, a sample is placed in the sample holder, and the pendulum is released. The puncture energy reading is recorded. The test is repeated until 6 samples have been evaluated. The results are calculated in cm-kg per mil of film thickness.

The impulse sealing range test is run to determine the acceptable voltage range for sealing a plastic film. A Sentinel Model 12-12AS laboratory sealer manufactured by Packaging Industries Group, Inc., Hyannis, Me. was used. The sealing conditions were 0.5 second impulse time, 2.2 seconds cooling time and 50 psi jaw pressure. The minimum voltage was determined as that voltage which was capable of sealing four pieces of film together, thereby simulating a fold commonly encountered in field testing. The maximum sealing voltage was determined as the voltage at which seal "burn-thru" begins to occur. "Burn-thru" is defined as holes or tears in the seal caused by the high temperature and pressure of the sealing ribbon. "Burn-thru" has a detrimental effect on seal strength and package integrity, as well as final package appearance.

EXAMPLE I

Biaxially stretched three-layer films were prepared by a "double bubble" process similar to that disclosed in U.S. Pat. No. 3,456,044 by co-extruding the following compositions through a multilayer die, biaxially stretching the co-extruded primary tube, and then irradiating the biaxially stretched tube.

Film composition 1 was made having an inner layer of ethylene-vinyl acetate copolymer containing about 12 percent by weight of vinyl acetate, based on the weight of the copolymer, and having a melt index of about 0.25 decigram per minute (EVA Copolymer); a core layer of vinylidene chloride-vinyl chloride copolymer containing about 85 weight percent vinylidene chloride and about 15 weight percent vinyl chloride (VDC-VC Copolymer); and an outer layer comprising a blend of (a) about 75 weight percent of ethylene-vinyl acetate copolymer having about 12 weight percent vinyl acetate and a melt index of about 0.35 decigram per minute, and (b) about 25 weight percent of ethylene-vinyl acetate copolymer having about 4.5 weight percent vinyl acetate and a melt index of about 0.25 decigram per minute (EVA Copolymer).

Film composition 2 had the same composition as film composition 1, except that the outer layer comprised an ethylene-vinyl acetate copolymer having about 15 weight percent vinyl acetate and a melt index of about 0.5 decigram per minute.

Film composition 3 had the same composition as film composition 1, except that the core layer comprised vinylidene chloride-methyl acrylate copolymer containing about 8 weight percent methyl acrylate and having a molecular weight of about 100,000.

Film composition 4 had the same composition as film composition 1, except that the core layer comprised vinylidene chloride-methyl acrylate copolymer containing about 8 weight percent methyl acrylate and having a molecular weight of about 115,000.

The resulting biaxially stretched films each had an average thickness of about 2.4 mils. The films were then each irradiated to a dosage level of about 3 megarads by passing the films through the electron curtain of an irradiation unit and immediately rewinding the films.

The physical properties of the irradiated films were evaluated and are summarized in Table 1.

TABLE 1

| Film | Physical Properties of Irradiated Film Compositions | | | |
|---|---|---|---|---|
| | 1 | 2 | 3 | 4 |
| Shrinkage @ 90° C., % MD/TD | 40/50 | 43/44 | 44/52 | 44/51 |
| Tensile strength, psi, MD/TD | 9400/9200 | 9900/9400 | 9800/9900 | 8500/8800 |
| Elongation @ Break, % MD/TD | 170/205 | 200/200 | 200/190 | 195/180 |
| Dynamic Puncture, cmkg/mil | 1.4 | 1.8 | 1.1 | 1.2 |
| Oxygen Transmission, (CC/100 in$^2$/24 hr./atm) | 1.4 | 1.4 | 1.25 | 1.62 |

It can be seen from Table 1 that the physical properties of film compositions 1 through 4 are similar.

The impulse sealing properties of film compositions 1, 3 and 4 were studied and are summarized in Table 2. It can be seen therefrom that the sealing temperature is similar for the three film compositions. The sealing device employed was a Sentinel Model 12-12AS, operated as earlier described.

TABLE 2

| Film | Sealing Properties of Irradiated Film Compositions | | |
|---|---|---|---|
| | 1 | 3 | 4 |
| Minimum voltage | 27 | 26 | 26 |
| Maximum voltage | 40 | 40 | 40 |

The storage stability properties of film compositions 1 through 4 were evaluated by placing samples thereof in an oven at a temperature of about 120° F. to simulate storage of up to 250 days at about 70° F. The storage stability properties of the film compositions were based upon the color development of the film samples measured. The films were compared to a set of color standards and given a numerical color rating. The rating system is as follows: 1—slight yellow cast, 2—moderate yellow cast, 3—unacceptable yellow color. The results of this study are shown graphically in FIG. 1 wherein the color rating measurements for film compositions 1 and 2 were combined, and those for film compositions 3 and 4 were also combined. The color rating measurements for film compositions 1 and 2 are shown in FIG. 1 as the dotted line, and those for film compositions 3 and 4 are shown thereon as the solid line. It can be seen from FIG. 1 that film compositions 3 and 4, i.e., the multilayer films having a core layer of vinylidene chloride-methyl acrylate copolymer, display far less color development than multilayer film compositions 1 and 2 having a core layer of vinylidene chloride-vinyl chloride copolymer. In addition, color development in film compositions 3 and 4 leveled off after about the 120-day period, while film compositions 1 and 2 continued to discolor throughout the study period.

In summary, the novel film compositions of this invention have been shown to possess physical properties required for use in packaging primal and sub-primal meat cuts and processed meats, while additionally possessing improved resistance to the color degradation caused by irradiation of the film. Furthermore, the film compositions of the present invention also have the required properties for use as bags, wherein the bags provide the desired heat-shrinking and heat-sealing characteristics in such packaging operations, while retaining a more desirable appearance than those bags of the prior art.

In general, various conventional additives such as slip agents, antiblock agents, and pigments may be incorporated in the films of the present invention in accordance with conventional practice.

Although preferred embodiments of this invention have been described in detail, it is contemplated that modifications thereof may be made and some preferred features may be employed without others, all within the spirit and scope of the invention. Additionally, although three-layer films are illustrated in the examples, multilayer films having less or more than three layers are contemplated within the scope of this invention provided that at least one of the plurality of layers comprises a layer of vinylidene chloride-methyl acrylate copolymer.

What is claimed is:

1. A process for producing a multilayer film suitable for packaging primal and sub-primal meat cuts and processed meats comprising:
   (a) co-extruding a first outer film layer, a core film layer comprising a vinylidene chloride-methyl acrylate copolymer, and a second outer film layer;
   (b) biaxially stretching said multilayer film; and
   (c) irradiating said multilayer film to a dosage level of between about 1 megarad and about 5 megarads.

2. A process for producing a multilayer film suitable for packaging primal and sub-primal meat cuts and processed meats comprising:
   (a) co-extruding a first outer film layer comprising an ethylene-vinyl acetate copolymer, a core film layer comprising a vinylidene chloride-methyl acrylate copolymer, and a second outer film layer comprising an ethylene-vinyl acetate copolymer;
   (b) biaxially stretching said multilayer film; and
   (c) irradiating said multilayer film to a dosage level of between about 1 megarad and about 5 megarads.

3. A process in accordance with claim 2 wherein said first outer layer comprises an ethylene-vinyl acetate copolymer having a melt index of from about 0.1 to about 1.0 decigram per minute, and a vinyl acetate content of from about 9 to about 15 weight percent, based on the weight of said ethylene-vinyl acetate copolymer.

4. A process in accordance with claim 2 wherein said first outer film layer comprises an ethylene-vinyl acetate copolymer having a melt index of from about 0.1 to about 1.0 decigram per minute and a vinyl acetate content of from about 9 to about 15 weight percent, based on the weight of said ethylene-vinyl acetate copolymer.

5. A process in accordance with claim 2 wherein said second outer layer comprises an ethylene-vinyl acetate copolymer having a melt index of from about 0.1 to about 1.0 decigram per minute and a vinyl acetate content of from about 3 to about 18 weight percent, based on the weight of said ethylene-vinyl acetate copolymer.

6. A process in accordance with claim 2 wherein said core layer comprises a vinylidene chloride-methyl acrylate copolymer containing at least about 85 weight percent of vinylidene chloride, based on the weight of said vinylidene chloride copolymer.

7. A process in accordance with claim 2 wherein said vinylidene chloride copolymer contains a maximum of 5 weight percent plasticizer, based on the total blend weight of additives and said vinylidene chloride copolymer.

8. A process in accordance with claim 2 wherein said core layer comprises a vinylidene chloride-methyl acrylate copolymer containing from about 5 to about 15 weight percent of methyl acrylate, based on the weight of said vinylidene chloride copolymer.

9. A process in accordance with claim 2 wherein said second outer layer comprises a blend of at least two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and one of said ethylene-vinyl acetate copolymers has a melt index of from about 0.1 to about 1.0 decigram per minute and a vinyl acetate content of from about 2 to about 10 weight percent, based on the weight of said copolymer.

10. A process in accordance with claim 9 wherein said blend of said ethylene-vinyl acetate copolymers has a vinyl acetate content of from about 3 to about 18 weight percent, based on the weight of said blend of ethylene-vinyl acetate copolymers.

11. A process in accordance with claim 2 wherein said first outer layer has a thickness from about 1.1 mils to about 1.6 mils.

12. A process in accordance with claim 2 wherein said core layer has a thickness of from about 0.25 mil to about 0.45 mil.

13. A process in accordance with claim 2 wherein said second outer layer has a thickness of from about 0.4 mil to about 1.0 mil.

14. A process in accordance with claim 2 wherein said multilayer film has a total thickness of from about 1.75 mils to about 3.0 mils.

15. A process in accordance with claim 2 wherein said multilayer film is irradiated to a dosage level of between about 2 megarads and about 3 megarads.

16. A process in accordance with claim 2 including fabricating said multilayer film into the form of a bag.

17. A process for producing a multilayer film suitable for packaging primal and sub-primal meat cuts and processed meats comprising:
(a) co-extruding a first outer film layer comprising an ethylene-vinyl acetate copolymer having a melt index of from about 0.1 to about 1.0 decigram per minute and a vinyl acetate content of from about 9 to about 15 weight percent, based on the weight of said ethylene-vinyl acetate copolymer, said ethylene-vinyl acetate copolymer being selected from group consisting of (a) a single ethylene-vinyl acetate copolymer, and (b) a blend of ethylene-vinyl acetate copolymers having melt indices and vinyl acetate contents within the aforementioned ranges; a core film layer comprising a vinylidene chloride-methyl acrylate copolymer; and a second outer film layer comprising an ethylene-vinyl acetate copolymer selected from the group consisting of (a) an ethylene-vinyl acetate copolymer having a melt index of from about 0.1 to about 1.0 decigram per minute and a vinyl acetate content of from about 3 to about 18 weight percent, based on the weight of said ethylene-vinyl acetate copolymer, and (b) a blend of at least two ethylene-vinyl acetate copolymers, wherein one of said ethylene-vinyl acetate copolymers has a melt index of from about 0.1 to about 1.0 decigram per minute and a vinyl acetate content of from about 10 to about 18 weight percent, based on the weight of said copolymer, and the other ethylene-vinyl acetate copolymer has a melt index of from about 0.1 to about 1.0 decigram per minute and a vinyl acetate content of from about 2 to about 10 weight percent, based on the weight of said copolymer;
(b) biaxially stretching said multilayer film; and
(c) irradiating said multilayer film to a dosage level of between about 1 megarad and about 5 megarads.

18. A process in accordance with claim 17 wherein said vinylidene chloride-methyl acrylate copolymer contains at least about 85 weight percent vinylidene chloride, based on the weight of said copolymer.

19. A process in accordance with claim 17 wherein said vinylidene chloride-methyl acrylate copolymer contains a maximum of 5 weight percent plasticizer, based on the total blend weight of additives and said vinylidene chloride copolymer.

20. A process in accordance with claim 17 wherein said vinylidene chloride copolymer contains from about 5 to about 15 weight percent of methyl acrylate, based on the weight of said vinylidene chloride copolymer.

21. A process in accordance with claim 17 wherein said first outer layer has a thickness from about 1.1 mils to about 1.6 mils.

22. A process in accordance with claim 17 wherein said core layer has a thickness of from about 0.25 mil to about 0.45 mil.

23. A process in accordance with claim 17 wherein said second outer layer has a thickness of from about 0.4 mil to about 1.0 mil.

24. A process in accordance with claim 17 wherein said multilayer film has a total thickness of from about 1.75 mils to about 3.0 mils.

25. A process in accordance with claim 17 wherein said multilayer film is irradiated to a dosage level of between about 2 megarads and about 3 megarads.

26. A process in accordance with claim 17 including fabricating said multilayer film into the form of a bag.

* * * * *

Adverse Decisions In Interference

Patent No. 4,892,603, Stanley Lustig, Jeffrey M. Schuetz, Stephen J. Vicik, IRRADIATED MULTI-LAYER FILM FOR PRIMAL MEAT PACKAGING, Interference No. 103,284, final judgement adverse to the patentees rendered February 29, 2000, as to claims 2-26.
*(Official Gazette May 2, 2000)*